Aug. 17, 1926.
C. D. SMITH
1,596,634
SEED STRIPPING MACHINE
Filed June 2, 1923    5 Sheets-Sheet 3
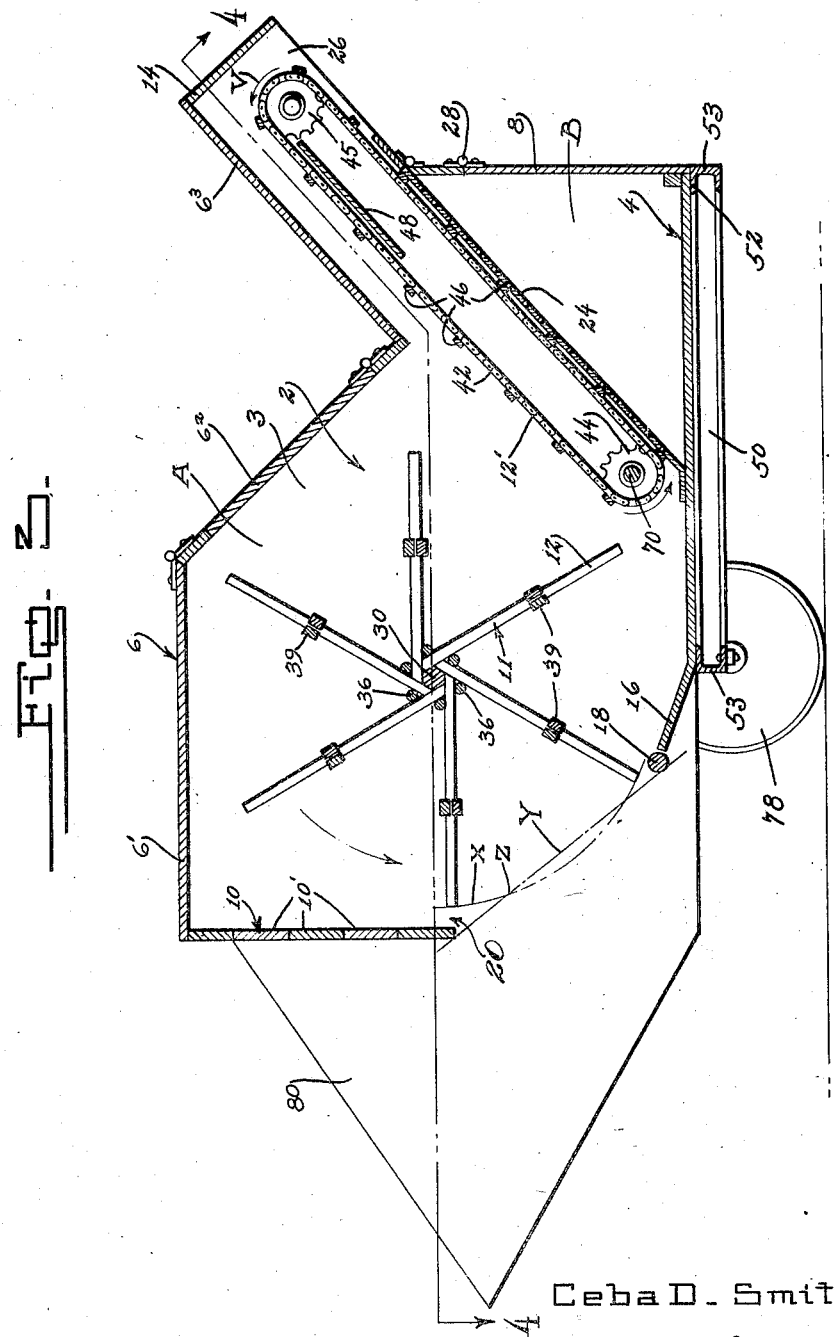
Inventor
Ceba D. Smith
By Jacobi & Jacobi
Attorneys Aug. 17, 1926.                                      1,596,634
                    C. D. SMITH
              SEED STRIPPING MACHINE
              Filed June 2, 1923        5 Sheets-Sheet 4
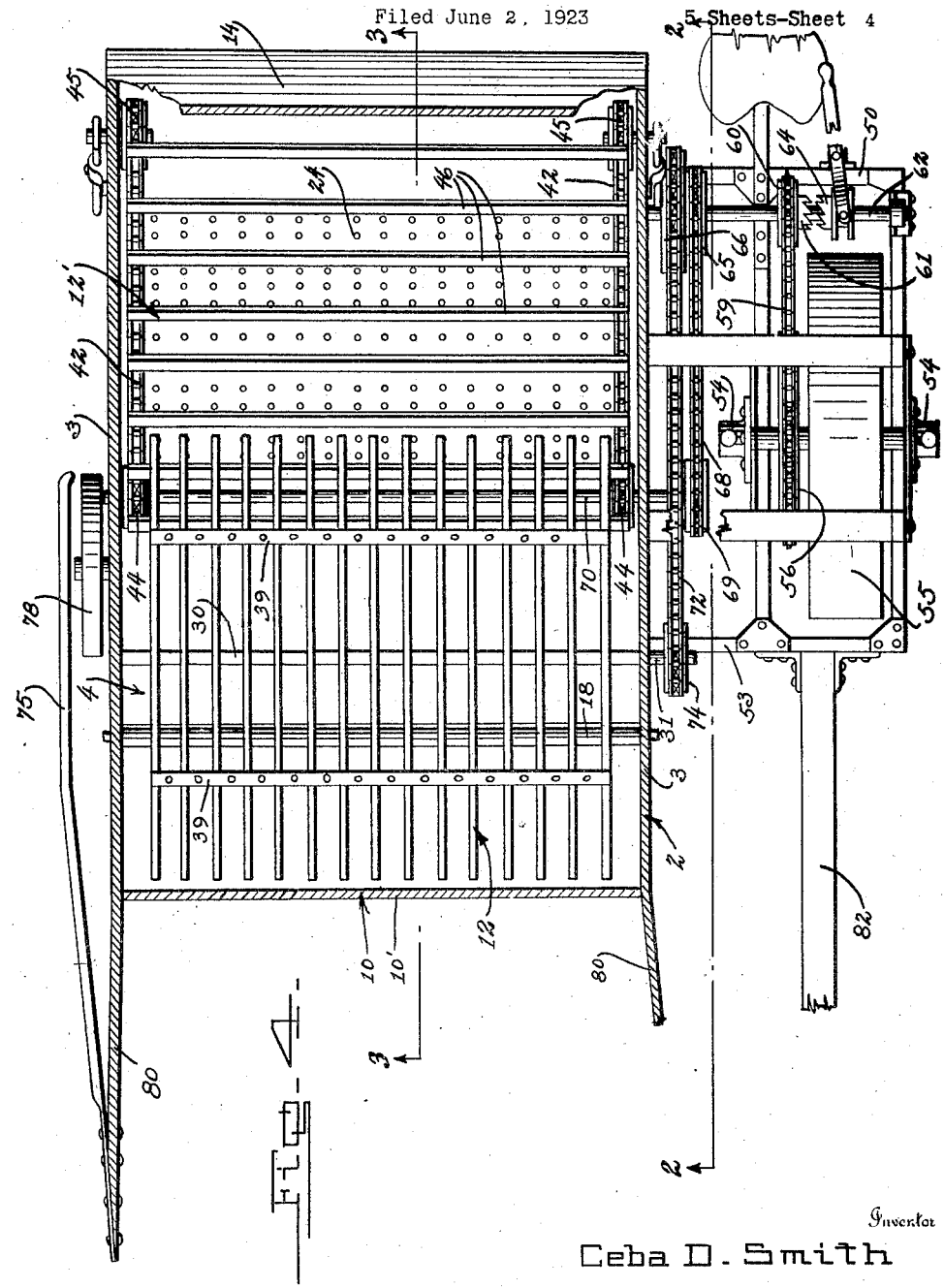
Inventor
Ceba D. Smith
By Jacobi & Jacobi
Attorneys

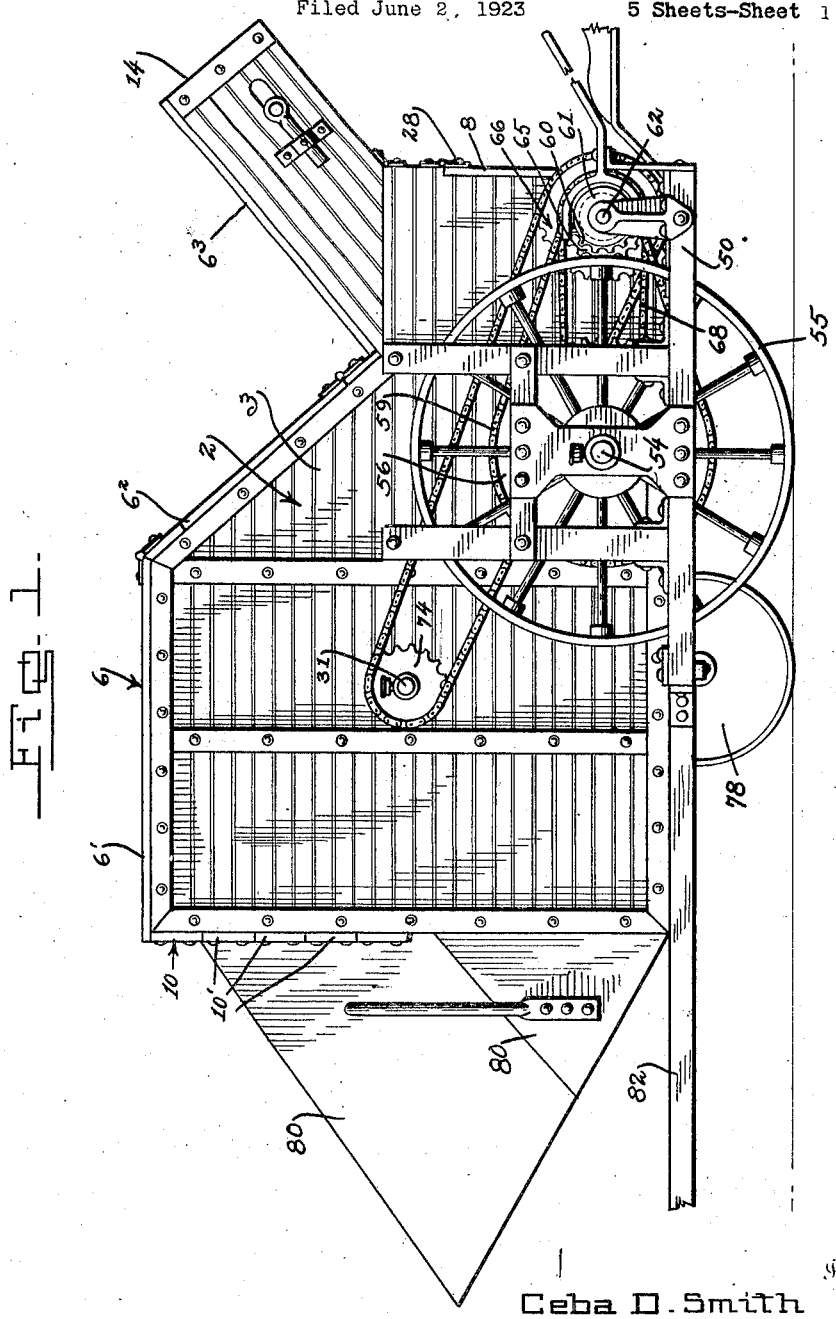

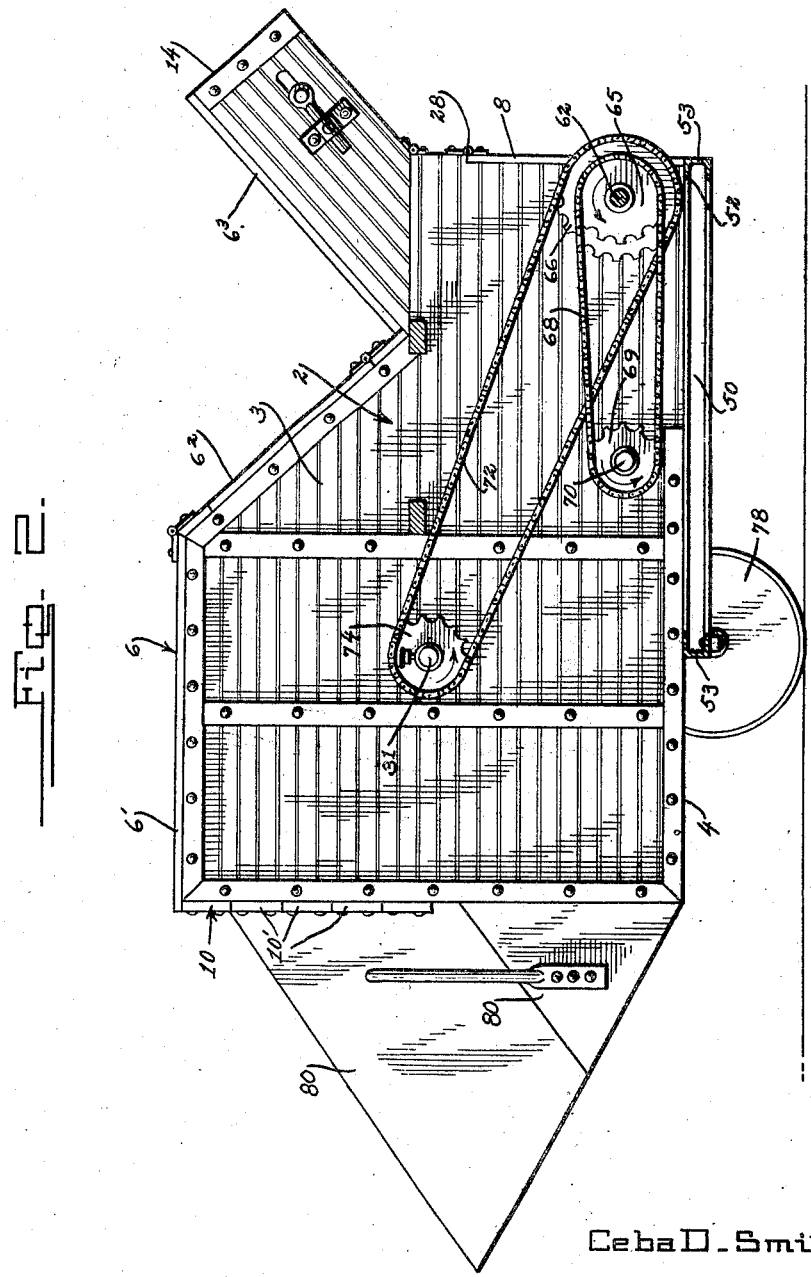

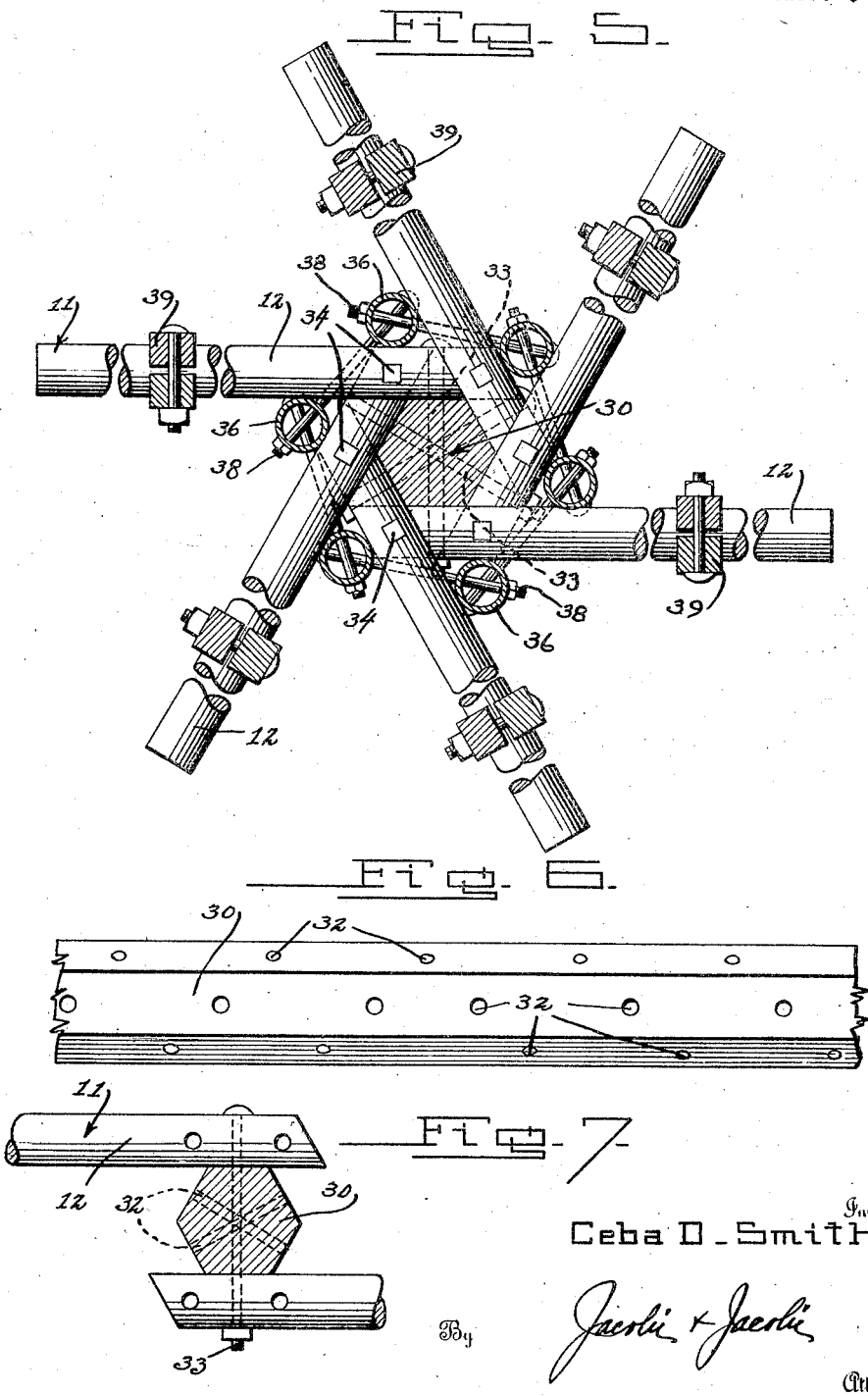

Patented Aug. 17, 1926.

1,596,634

UNITED STATES PATENT OFFICE.

CEBA D. SMITH, OF DUDLEY, ILLINOIS.

SEED-STRIPPING MACHINE.

Application filed June 2, 1925. Serial No. 642,931.

This invention relates to a machine for harvesting sweet clover seed in which the seed is stripped from the standing plants in the field, and while primarily designed to harvest sweet clover seed, is well adapted for harvesting soy beans or any other seed that from the nature of its growth is adapted to be harvested in that way.

The object of the machine is to provide an apparatus which is adapted to be drawn over the field either by horse or motor power, and which through a revolving cylinder within the machine, and rotating in the direction of its travel, strips the seed from the standing plants, and casts them rearwardly onto a perforated metal plate or screen, the seed falling through the perforations into a chamber, therebeneath while the foreign matter is carried over by a slatted conveyor and drops to the ground in the rear of the machine.

Among the various objects of the invention may be mentioned the following:

First, the construction of a cylinder, the teeth of which strip the seed clean of the plant; second, the arrangement by which the stubble and trash is released after the seed is stripped from the plant; third, the method of assembling the housing, cylinder, roller, conveyor, screen and seed receptacle; fourth, the method of stripping, separating and carrying the seed; fifth, the method construction that brings the seed heads in contact with the cylinder teeth, and sixth, but quite important object, that of the method of construction and arrangement that admits the seed heads to the cylinder teeth at the opportune instant for the seed to be thrown into the machine instead of on the ground in front of the machine.

Referring now to the accompanying drawings forming a part of this specification and illustrating a preferred embodiment of my invention, Figure 1 is a side elevation of my improved seed harvesting machine;

Figure 2 is a section taken on line 2—2 of Figure 4;

Figure 3 is a central longitudinal section taken on line 3—3 of Figure 4;

Figure 4 is a horizontal section taken on line 4—4 of Figure 3;

Figure 5 is an enlarged detailed section of the stripping cylinder; and

Figures 6 and 7 are enlarged details of certain portions of the cylinder.

Referring now more particularly to the drawings by numerals of reference, the frame of the machine is designated generally by the numeral 2 and includes a housing or casing comprising opposite side walls 3, a floor 4, a top indicated generally at 6, a rear end wall 8 and a front wall 10.

Upon reference particularly to Figure 3 which is a central, longitudinal sectional view through the housing or casing, it will be observed that the latter is constructed to provide in reality a pair of chambers, A and B, respectively, in the former of which is rotatably mounted the stripping cylinder 11 to be described in detail hereinafter, while the latter constitutes a compartment in which is mounted the inclined conveyor 12', also to be described in full.

With particular reference to the elements of the housing, that portion of the top which covers the stripping cylinder, and which I have indicated at $6^1$ is substantially horizontal and may be removable as an entirety or if desired may be hinged along one edge to permit of access when necessary to the interior of the casing. At a point substantially over the rear portion of the cylinder 11 the top is inclined rearwardly and downwardly as shown at $6^2$ and preferably this portion of the top is hinged along one edge or if desired, entirely removable, suitable securing or fastening means being employed to prevent displacement when the machine is in operation. This rearwardly and downwardly inclined top portion terminates at a point substantially midway the length of the conveyor to be later described, and from this point, the top is upwardly and rearwardly inclined at $6^3$, being spaced above, but in substantially parallel relation with the upper portion of the inclined conveyor 12'. The portion $6^3$ of the top terminates in a downwardly and rearwardly inclined deflector plate 14, which serves to direct the refuse after being operated upon, onto the ground at the rear of the machine.

It will be observed upon reference to Figure 3 of the drawings, that the floor 4 of the casing terminates inwardly of the extreme forward edges of the side walls 3, and is provided with an upwardly and forwardly inclined ledge 16 arranged in front of and in close proximity to the edge of which is a roller 18, the ends of which are journalled in the side walls of the casing. The relation of the roller 18 with respect to the teeth 12 of the stripping cylinder 11, is such that the teeth, as they move in the arc of a circle, strike the seed-carrying portion of the plant at the logical point to strip the seeds, as more clearly illustrated in Figure 3, the roller being loose on its bearings, permitting the stubble to ride freely thereover and released, without its being pulled up by the roots and carried into the machine and clogging the same as would be the case were a stationary edge employed. It is obvious that the elimination of the feeding of the stubble into the machine, results not only in a more proper functioning of the machine, but also results in reducing the load upon the elements of the apparatus. Briefly, the function of the roller, in addition to that above stated, is to roll down the tall standing plants and thereby cause the seed heads of the clover to come in contact with the cylinder teeth 12 at their outer portions.

The front wall 10 of the casing performs an extremely important function in the successful operation of this machine, when taken in connection with its relation to the stripping cylinder 11 and the roller 18, it being observed that said wall depends as a curtain from the forward edge of the top portion 6' leaving at its lower edge an opening exposing a portion of the said cylinder, for action upon the clover plants. By providing this front wall 10 of removable sections 10', the opening may be regulated in size. The position of the lowermost section is one controlling factor in the successful operation of this apparatus for reasons which will now be pointed out:

By providing such means for increasing or decreasing the size of the opening the lowermost section may be positioned to effectually operate upon the blooms or heads of a stand of tall or short clover, that is to say, if the clover is tall the lowermost section is elevated, and if the clover is short in height the lowermost section may be lowered.

Referring to Figure 3, wherein the light line $x$ describes the arc travelled by the points of the cylinder teeth 12, it will be noted, that if the teeth strike the seed above the upper point Z, at which the line of the arc $x$ and a straight line Y between the lower edge of the lower section and the roller meet, the stroke of the teeth is downwardly, and the seed is thrown onto the ground in front of the machine. But, if the seed heads are held out of the path of the teeth until their stroke has assumed a rearward direction, as it is below the point Z at which the arcuate and straight line meet, then the seed is deflected into the machine, instead of being thrown in front of it. Therefore, to successively harvest the seed, the seed heads must be kept away from the path of movement of the cylinder teeth until their stroke is in a generally rearward direction.

Referring to Figure 3 which will serve to illustrate the manner in which my machine is intended to operate, it will be observed that as the machine moves forwardly, the front wall 10 and roller 18 are pressed against the standing plants, and as the movement of the machine is continued, the plants first encountered are pushed forwardly against the plants in front of them. As the machine continues to advance, the plants first encountered are drawn under the machine, pressed down by the roller 18 and held closely to the front of the machine by the wall of standing plants in front of them. Now it will be seen that because the seed is at the top of the plant, as the plant is drawn past the cylinder, there is nothing between the seed heads and the cylinder teeth. Then, because these seed heads are held firmly against the front wall of the machine by the wall of plants in front of them, as they pass the cylinder going under the machine, the seed is stripped off by the cylinder teeth and thrown into the machine, and carried onto and over a screen 24 to be later described by the conveyor 12', and through which screen the seed falls, while the trash is carried upwardly and rearwardly to an opening 26 at the rear of the machine to be ultimately deposited upon the ground, the screened seed falling through the screen 24 onto the floor of the compartment or chamber B from which it may be removed by removing the rear wall 8, which may be hinged if desired as at 28.

Referring now to the specific construction of the stripping cylinder 11, it comprises a transverse hexagonal shaft or hub 30, the ends of which are journaled in suitable bearing boxes 31 arranged in the opposite side walls of the casing. The shaft is provided with a series of transverse openings 32 bored therethrough in three planes said openings individually penetrating the shaft from diametrically opposite faces. The openings are further arranged in spiral formation, the spirals being oppositely disposed from a point at substantially the longitudinal center of said shaft for the purpose of balancing lateral thrust due to the impact of the teeth 12 of the stripping cylinder with the plants. Referring to Figures 5 and 6 which illustrate in detail the specific construction of the teeth and their manner of assembly on the hub, it will be noted that each tooth 12 comprises a rod which is fastened by means of a transverse bolt 33 to one face of the hexagonal shaft, a single bolt serving to simultaneously clamp two diametrically opposed teeth, which it might be noted are arranged to rotate in the same vertical plane. Further, it will be observed that each diametrically opposed pair is laterally offset from an adjacent pair from a point at the center of the shaft toward opposite ends respectively, for the purpose of balancing as has been set forth. The inner end of each tooth is secured to the inner end of an adjacent tooth through means of a tie bolt 34.

To further insure stability of structure, I bind the teeth at their base through means of a plurality of pipes 36 which respectively are arranged at the bases of or in the crotch between adjacent teeth, these pipes extending throughout the length of the cylinder and drawn tightly into the several crotches by means of tie bolts 38. The teeth are also stayed and given additional stability by means of clamps 39 secured across the several teeth, at a point intermediate their length.

Mounted within the compartment B at the rear of the machine, and arranged at an angle of approximately 45 degrees to the horizontal is an upwardly and rearwardly inclined perforated metal plate or screen 24 referred to in an early part of this specification, this screen being adapted to receive the seed thrown into the housing by the stripper cylinder teeth, said screen being supported in any suitable manner.

For the purpose of cleaning or clearing the upper surface of the screen of all foreign matter so that it may function to the greatest advantage, in permitting the seed to fall therethrough, I provide the endless conveyor or belt 12', heretofore referred to, and which comprises a pair of oppositely disposed endless sprocket chains 42, which travel over and are maintained taut by sprocket wheels 44 and 45 arranged in bearing boxes respectively adjacent opposite ends of the rear compartment B, said chains having connected therewith at their opposite ends, a parallel series of transverse scraping bars or slats 46. The conveyor is arranged on an inclined plane, parallel to that of the screen 24 and to top section 6³, being as previously stated in spaced relation to the latter and so disposed to the former that the slats 46 rub lightly thereon or may if desired be slightly spaced therefrom during travel of the conveyor, the latter moving in the direction of the arrow V. A return board 48 is arranged beneath the upper leg of the endless conveyor for the purpose of preventing straw from rolling between the conveyor slats.

Referring now to the driving means for the rotary stripping cylinder 11 and the endless conveyor 12', and the associated mechanism, and with particular reference to Figure 4, the frame for supporting one side of the housing is shown at 50, and comprises a rectangular metal laterally extending structure suitably connected as at 52 with the said housing through arms 53, and said frame having journaled therein in boxings 54, the ground or master wheel 55, on the axle of which is fixed a large sprocket wheel 56. Through a sprocket chain 59, this wheel 56 drives a relatively smaller sprocket wheel 60 formed as a part of a clutch member 61 loosely mounted on a counter shaft 62 and cooperating with a companion clutch member 64 slidably keyed on said shaft. This shaft 62 is journaled at its ends respectively in the frame 50 and one side wall of the housing, and has keyed or otherwise fixed thereon at the inner end thereof, a pair of sprocket wheels 65 and 66, arranged side by side, the former being relatively of smaller diameter than the latter. The smaller sprocket wheel 65, through a sprocket chain 68, drives a sprocket wheel 69, fast on the lower or forward shaft 70, which carries the sprocket wheels 44 for driving the endless conveyor 12'. The larger sprocket wheel 66, through a sprocket chain 72, drives a sprocket wheel 74 fast on an extension 31 of the cylinder shaft or hub 30. The numeral 75 designates a lateral guard rod, while the grain wheel for supporting the side of the housing is shown at 78. Numerals 80 designate the guide plates arranged vertically at the forward edges of the side walls of the housing, while the draft tongue is shown at 82.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to, without departing from the spirit or sacrificing any of the principles of the invention.

The construction and operation of this machine should now be clear, especially to those familiar with the art to which it relates, and having fully described a preferred embodiment of my clover seed harvester, what I claim as my invention is:—

A seed stripping machine comprising a frame, a reel journaled thereon and having arms, a floor located below the reel, a ledge plate located at the forward edge of the floor and being upwardly and forwardly inclined, a roller located at the forward edge of the ledge plate and located adjacent the path of movement of the outer ends of the arms of the reel and a hood disposed over the reel and having a series of sections detachably mounted and disposed above the level of the roller, the lower section having its edge spaced from and in advance of the axis of the reel, the arms being of such relative length that their outer extremities pass through the space between the edge of the lower hood section and the roller as the reel rotates.

In testimony whereof I affix my signature.

CEBA D. SMITH.